No. 799,617. PATENTED SEPT. 12, 1905.
E. P. STEFFA.
FRUIT CLIPPER.
APPLICATION FILED MAY 22, 1905.
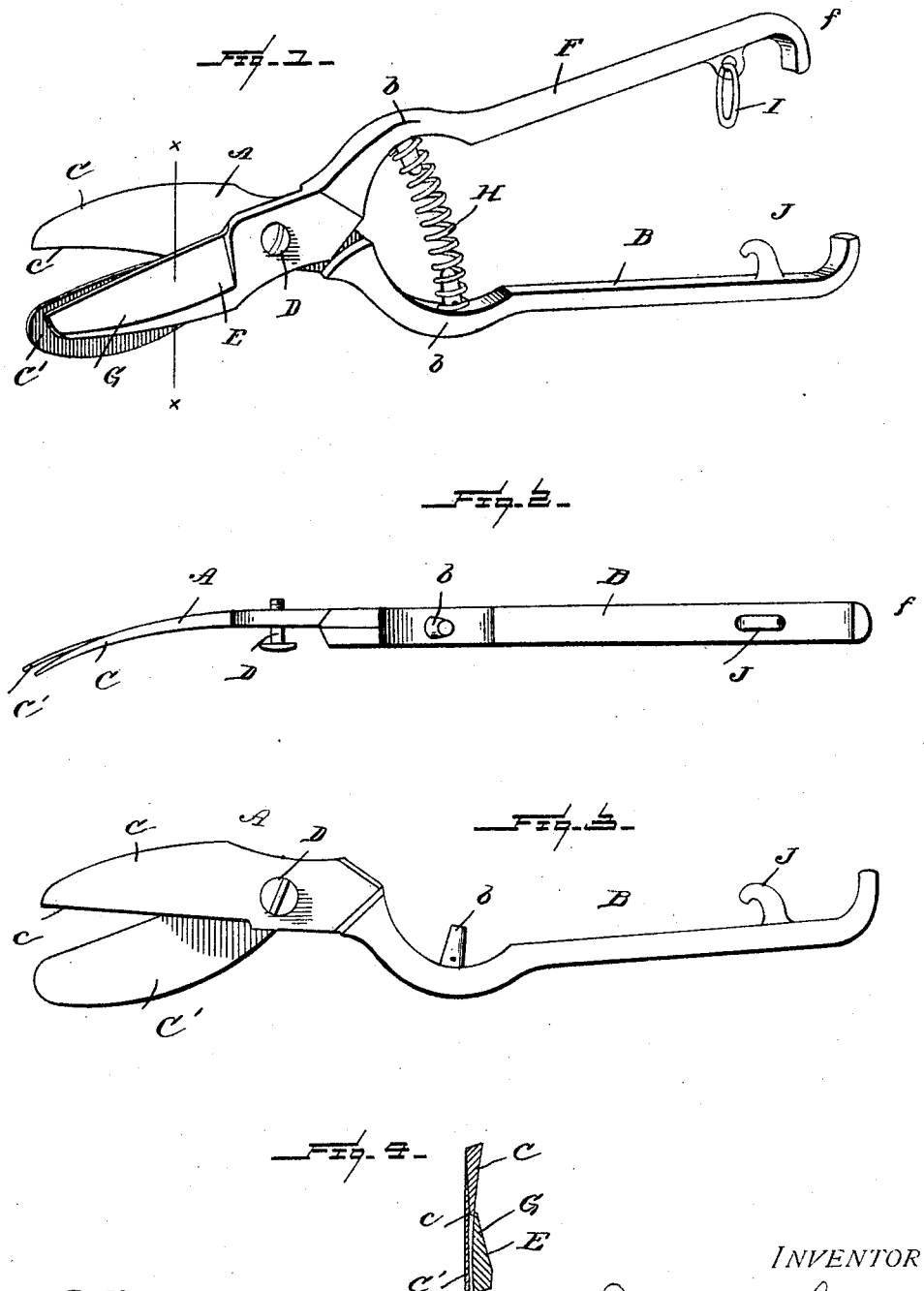

UNITED STATES PATENT OFFICE.

EMIL P. STEFFA, OF POMONA, CALIFORNIA.

FRUIT-CLIPPER.

No. 799,617.  Specification of Letters Patent.  Patented Sept. 12, 1905.

Application filed May 22, 1905. Serial No. 261,695.

*To all whom it may concern:*

Be it known that I, EMIL P. STEFFA, a citizen of the United States, residing at Pomona, in the county of Los Angeles and State of California, have invented a new and useful Improvement in Fruit-Clippers, of which the following is a specification.

My invention relates to improvements in fruit-clippers, and pertains particularly to that class used in cutting the stems of oranges, lemons, and the like in gathering the same.

The object of my invention is to provide a clipper of this character in which the cutting-blade is held away from the fruit while the stem is being cut, and thus reducing to a minimum the liability of cutting the skin of the fruit, it being understood that the cutting of the skin of the fruit causes the same to soon spoil, and the packing thereof will cause the adjoining fruit to also spoil.

In the accompanying drawings, Figure 1 is a perspective view of my improved clippers, showing the cutting-blade opened by the spring. Fig. 2 is a top plan view showing the cutting-blade removed. Fig. 3 is a side view of Fig. 2, and Fig. 4 is a transverse sectional view taken on the line $x$ $x$ of Fig. 1.

Referring now to the drawings, A represents the stationary member of my improved clipper, which is provided with the ordinary handle B and which, as shown, is of that form ordinarily used in pruning-knives. The outer end of said stationary member is forked, forming the two upwardly-curved members C and C', the same being made as a single piece, the member C being, as clearly shown, of ordinary form with the cutting edge $c$, against which the movable cutting-blade is adapted to move and by means of which the stem is severed, as hereinafter more fully described. The member C', as shown, is of a width and length considerably greater than that of the member C and forms the guard for the movable blade. The member C' is on a plane slightly below that of the member C, and thus supports the cutting edge of the stationary member a slight distance from the skin of the fruit being cut.

The curve of the stationary forked member is such that during the ordinary cutting of the stem the ends of the same will be held away from the fruit, and thus lessening the liability of injury to the same. Pivotally carried by the member A by means of the screw D is the movable member E, which is provided with the operating-handle F, which is precisely like the handle B of the stationary member. The opposite end of said member is provided with the cutting-blade G, which, as shown, is approximately the shape of the member C and also curved upwardly. The member C', as heretofore described, is of such a width and length that the outer end of the movable blade, when the same is opened to its full extent, does not pass from over said member, and thus the outer end of the said blade cannot possibly engage the fruit during its travel in its cutting operation. The guard C', as heretofore described, being below the plane of the member C holds the upper cutting edge away from the fruit, and thus absolutely prevents the skin of the fruit from being cut or otherwise injured.

The handles B and F adjacent their pivotal connection are provided with lugs $b$, which pass within the end of the coil-spring H, which normally holds the movable cutting-blade outwardly over the guard, as shown in Fig. 1 of the drawings, and opens the blades when the pressure on the handle is released. The outer ends of the handles are provided with inwardly-turned ends $f$, which abut to limit the inward movement of the handles. The handle F is provided with a swinging link I, which is adapted to pass over a hook J, carried by the handle B, and by means of which the handles are locked together when the clipper is not in use.

Having thus fully described my invention, what I claim as new, and desire to secure by Letters Patent, is—

1. A device of the character described, comprising a forked member, one of said forks having an inner cutting edge, the other of said forks being in a plane below the first-mentioned fork, and a movable cutter carried by the said forked member.

2. A device of the character described, comprising a curved forked member, one of said forks having an inner cutting edge, the other fork being wider and longer than the first-mentioned fork and in a plane below the same, and a pivoted knife carried by the forked member above the enlarged fork and traveling in a path above the same.

3. A device of the character described, comprising an upwardly-curved forked member, one of said forks having an inner cutting edge, the other fork being wider and longer than the first-mentioned fork and in a plane below the same, and a pivoted upwardly-curved knife carried by the forked member and of a length less than the enlarged fork, whereby the outer end of the said pivoted knife travels across the said enlarged fork and the point and remainder of the blade is prevented from coming in contact with the fruit as the stem is being cut.

In testimony whereof I have hereunto signed my name to this specification in the presence of two subscribing witnesses.

EMIL P. STEFFA.

Witnesses:
RUSSELL K. PITZER,
ALLAN P. NICHOLS.